United States Patent
Ivanov et al.

(10) Patent No.: US 9,801,132 B2
(45) Date of Patent: Oct. 24, 2017

(54) METHOD AND SYSTEM FOR MANAGING TURBO MODE OPERATION

(71) Applicant: YANDEX EUROPE AG, Lucerne (CH)

(72) Inventors: Vladimir Leontievich Ivanov, Moscow (RU); Yuriy Vladimirovich Skvortsov, Saint-Petersburg (RU); Ilya Aleksandrovich Rubin, Moscow (RU); Alexey Evgenyevich Baranov, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/129,844

(22) PCT Filed: Dec. 1, 2014

(86) PCT No.: PCT/IB2014/066484
§ 371 (c)(1),
(2) Date: Sep. 28, 2016

(87) PCT Pub. No.: WO2015/181590
PCT Pub. Date: Dec. 3, 2015

(65) Prior Publication Data
US 2017/0164284 A1    Jun. 8, 2017

(30) Foreign Application Priority Data
May 28, 2014    (RU) ................................ 2014122113

(51) Int. Cl.
*H04Q 7/20*    (2006.01)
*H04W 52/02*    (2009.01)
(Continued)

(52) U.S. Cl.
CPC ......... *H04W 52/0219* (2013.01); *H04W 4/06* (2013.01); *H04W 4/08* (2013.01);
(Continued)

(58) Field of Classification Search
CPC ... H04L 5/0023; H04L 5/0044; H04L 5/0055; H04L 5/0066; H04L 5/0092; H04L 5/0098; H04W 72/005; H04W 84/12
(Continued)

(56) References Cited

U.S. PATENT DOCUMENTS 6,134,590 A    10/2000    Perlman
6,993,361 B2    1/2006    Chitrapu
(Continued)

FOREIGN PATENT DOCUMENTS

| EA | 20050001089 B1 | 12/2006 |
| WO | 0070585 A1 | 11/2000 |
| WO | 2014065882 A1 | 5/2014 |

OTHER PUBLICATIONS

English abstract of EA20050001089 retrieved from Espacenet dated Nov. 15, 2016.
(Continued)

*Primary Examiner* — Tan H Trinh
(74) *Attorney, Agent, or Firm* — BCF LLP

(57) ABSTRACT

A method of managing turbo mode operation of a first electronic device is provided. The first electronic device has been clustered with a second electronic device. The method is executable at a computing apparatus and includes receiving, via a communication network, a signal indicative of turbo mode operation of the second electronic device, and responsive to the signal indicative of turbo mode operation of the second electronic device, causing turbo mode operation of the first electronic device. Servers and electronic devices for implementing the method are also provided.

20 Claims, 4 Drawing Sheets

(51) Int. Cl.
*H04W 4/06* (2009.01)
*H04W 52/60* (2009.01)
*H04W 16/04* (2009.01)
*H04W 4/08* (2009.01)
*H04W 28/02* (2009.01)
*H04W 28/22* (2009.01)
*H04W 52/22* (2009.01)
*H04W 52/26* (2009.01)

(52) U.S. Cl.
CPC ....... *H04W 16/04* (2013.01); *H04W 28/0221* (2013.01); *H04W 28/22* (2013.01); *H04W 52/221* (2013.01); *H04W 52/223* (2013.01); *H04W 52/262* (2013.01); *H04W 52/60* (2013.01)

(58) Field of Classification Search
USPC ............ 455/69, 522, 13.4, 456.2, 512, 41.2, 455/67.11, 67.16, 552.1, 115.1, 561, 455/127.4; 370/338; 709/223, 204; 713/323; 375/340; 380/279
See application file for complete search history.

(56) References Cited

U.S. PATENT DOCUMENTS

| | | | |
|---|---|---|---|
| 7,509,377 B2* | 3/2009 | Harvey | H04L 12/1813 709/203 |
| 7,568,059 B2 | 7/2009 | Solomon et al. | |
| 7,742,945 B2 | 6/2010 | Rauba et al. | |
| 8,239,516 B2 | 8/2012 | Huslak et al. | |
| 2004/0230678 A1 | 11/2004 | Huslak et al. | |
| 2005/0033806 A1* | 2/2005 | Harvey | H04L 12/1813 709/204 |
| 2005/0239497 A1* | 10/2005 | Bahl | H04W 88/06 455/552.1 |
| 2008/0037792 A1* | 2/2008 | Becker | H04B 3/542 380/279 |
| 2011/0164174 A1 | 7/2011 | Limberg | |
| 2011/0208853 A1* | 8/2011 | Castro-Castro | H04L 12/14 709/223 |
| 2012/0166842 A1* | 6/2012 | Sur | G06F 1/206 713/323 |
| 2012/0263157 A1* | 10/2012 | Porat | H04L 5/0023 370/338 |
| 2013/0185388 A1 | 7/2013 | Mackie | |
| 2013/0301758 A1* | 11/2013 | Reial | H04L 25/03178 375/340 |
| 2014/0036666 A1 | 2/2014 | Sanda et al. | |
| 2014/0327630 A1* | 11/2014 | Burr | G06F 3/0488 345/173 |

OTHER PUBLICATIONS

Dudkin, The description of technology 108Mbps Wi-Fi devices, D-Link, http://hww.ru/wp/2008/02/opisanie-texnologii-108-mbits-v-wi-fi-ustrojstvax-d-link/, Feb. 5, 2008, 4 pages.
International Search Report from PCT/IB14/66484, Mar. 24, 2015, Lee W. Young.

* cited by examiner

METHOD AND SYSTEM FOR MANAGING TURBO MODE OPERATION

CROSS-REFERENCE

The present application claims convention priority to Russian Patent Application No. 2014122113, filed May 28, 2014, entitled "METHOD AND SYSTEM FOR MANAGING TURBO MODE OPERATION" which is incorporated by reference herein in its entirety.

FIELD

The present technology relates to downloading information via a communication network, and specifically to downloading information using a turbo mode of operation.

BACKGROUND

Various kinds of global or local communications networks (the Internet, the World Wide Web, local area networks and the like) provide access to a vast quantity of information stored in geographically far flung locations. The available information includes a variety of content types, such as photos, video, audio and the like, and relates to a wide range of topics, such as but not limited to news, weather, traffic, entertainment, finance and the like. The information is also accessed using a wide range of electronic devices such as desktop computers, laptop computers, smartphones, tablets and the like.

The speed at which this information can be accessed depends on factors such as, but not limited to, the amount of information being accessed, the format in which the information is being transmitted, the available bandwidth in the relevant communication network for transmission of information, the type of communication link being used to obtain the information, the number of users attempting to access the relevant information, and the like. For users of the electronic devices attempting to obtain information over the communication network, it can be frustrating to experience delays or time lags between requesting and receiving particular information.

It is generally known to switch electronic devices located on a slow connectivity network to a "turbo mode" of Internet operation for accessing information via the Internet. In a turbo mode of the Internet operation, resources are downloaded at a lower quality (for example, lower resolution images and the like) in order to reduce the amount of time needed for transmission and reception of the information. The turbo mode of operation therefore improves the speed of accessing information by sacrificing quality of the information accessed. In order to provide an improved web-browsing experience for a user, it is also known to monitor the user's network connection speed, and to switch that user's electronic device into the turbo Internet operation mode when the connection speed decreases. However, determining a decrease in the connection speed cannot be done instantaneously. Thus, even when this method of monitoring the connection speed and accordingly switching to a turbo mode of operation is employed, the amount of time taken to switch to turbo mode of operation is often long enough to be frustrating to the user.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions.

As such, according to a first broad aspect of the present technology, there is provided a method of managing turbo mode operation of a first electronic device is provided, the first electronic device having been clustered with a second electronic device. The method is executable at a computing apparatus. The method includes receiving, via a communication network, a signal indicative of turbo mode operation of the second electronic device; and responsive to the signal indicative of turbo mode operation of the second electronic device, causing turbo mode operation of the first electronic device.

In another aspect, the causing turbo mode operation for the first electronic device includes requesting a confirmation from the first electronic device for commencing operation in turbo mode, and responsive to receiving the confirmation from the first electronic device for commencing operation in turbo mode, operating the first electronic device in turbo mode.

In yet another aspect, the first electronic device is in communication with a first network resource via a first communication path, and the second electronic device being in communication with a second network resource via a second communication path. The method further includes clustering the first and second electronic devices based on an overlap between at least a portion of the first communication path and at least a portion of the second communication path.

In an additional aspect, the first electronic device is in communication with a first network resource via a first communication link, and the second electronic device is in communication with a second network resource via a second communication link. The method further includes clustering the first and second electronic devices based on a respective type of the first and second communication link.

In a further aspect, the first electronic device is connected to a first network resource, and the second electronic device is connected to a second network resource, the method further includes clustering the first and second electronic devices if the first network resource is the same as the second network resource.

In another aspect, the method includes clustering the first and second electronic devices if the first electronic device and the second electronic device are disposed within a predefined geographical area.

In an additional aspect, the signal indicative of turbo mode operation of the second electronic device is indicative of the second electronic device operating in turbo mode.

In another aspect, the signal indicative of turbo mode operation of the second electronic device is indicative of a connection speed of the second electronic device being less than a second electronic device connection speed threshold.

In yet another aspect, the signal indicative of turbo mode operation of the second electronic device is further indicative of a second electronic device connection speed confidence level, the second electronic device connection speed confidence level being a confidence level for an estimation of the connection speed of the second electronic device being less than the second electronic device confidence threshold.

In an additional aspect, the method further includes obtaining a connection speed of the first electronic device, and the causing of turbo mode operation for the first electronic device is executed responsive to the connection speed of the first electronic device being below a first electronic device connection speed threshold.

In a further aspect, the obtaining of the connection speed of the first electronic device is executed responsive to the signal indicative of turbo mode operation of the second electronic device.

In another aspect, the method includes obtaining a first electronic device connection speed confidence level. The first electronic device connection speed confidence level is a confidence level for estimation of the connection speed of the first electronic device being less than the first electronic device connection speed threshold. The causing of turbo mode operation for the first electronic device is executed responsive to the first electronic device connection speed confidence level being greater than a first electronic device connection speed confidence threshold.

In yet another aspect, the method includes obtaining a previously stored connection speed of the first electronic device, and the causing of turbo mode operation for the first electronic device is executed responsive to the previously stored connection speed of the first electronic device being below a previous connection speed threshold.

In an additional aspect, the obtaining of the previously stored connection speed of the first electronic device is executed responsive to the signal indicative of turbo mode operation of the second electronic device.

In a further aspect, the method includes obtaining a first electronic device previously stored connection speed confidence level. The first electronic device previously stored connection speed confidence level is a confidence level for estimation of the previously stored connection speed of the first electronic device being below the previous connection speed threshold. The causing of turbo mode operation for the first electronic device is executed responsive to the first electronic device previously stored connection speed confidence level being greater than a previously stored connection speed confidence threshold.

In another aspect, the method includes obtaining a connection speed of the first electronic device and a first confidence level for estimation of the connection speed of the first electronic device being below a first electronic device connection speed threshold. A connection speed of the second electronic device and a second confidence level for estimation of the connection speed of the second electronic device being below a second electronic device connection speed threshold is obtained. A previously stored connection speed of the first electronic device and a third confidence level for estimation of the previously stored connection speed of the first electronic device being below a first electronic device previous connection speed threshold is also obtained. The causing of turbo mode operation for the first electronic device is executed responsive to at least one of: the connection speed of the first electronic device being below the first electronic device connection speed threshold, the connection speed of the second electronic device being below the second electronic device connection speed threshold, the previously stored connection speed of the first electronic device being below the previous connection speed threshold; and an aggregate confidence level being greater than an aggregate confidence threshold. The aggregate confidence level is based on the first confidence level, the second confidence level, and the third confidence level.

In some embodiments, the computing apparatus is the first electronic device.

In some embodiments, the computing apparatus is a server operatively coupled to the first and second electronic device.

In another aspect, a server for managing turbo mode operation of a first electronic device is provided, the first electronic device having been clustered with a second electronic device. The server includes a network interface for communicating, via a communication network, with the first electronic device and the second electronic device, and a processor operatively coupled to the network interface. The processor is configured to receive a signal indicative of turbo mode operation of the second electronic device, and responsive to the signal indicative of turbo mode operation of the second electronic device, provide a signal to the first user device for causing turbo mode operation of the first electronic device.

In some embodiments, the first electronic device is in communication with a first network resource via a first communication path, and the second electronic device is in communication with a second network resource via a second communication path. The processor is further configured to cluster the first and second electronic devices based on an overlap between at least a portion of the first communication path and at least a portion of the second communication path.

In yet another aspect, an electronic device is configured for turbo mode operation. The electronic device is clustered with a second electronic device. The electronic device includes a communication interface for communicating with a server via a communication network, and a processor for managing turbo mode operation. The processor is operatively coupled to the communication interface. The processor is configured to receive from the server, via the communication interface, a signal indicative of turbo mode operation of the second electronic device, and responsive to the receipt of the signal indicative of turbo mode operation of the second electronic device, cause turbo mode operation.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "network resource" is any data or collection of data that can be provided by a publisher over a network and that is associated with a network resource address. Non-limiting examples of network resources include HTML pages, documents, images, video, feed sources, as well as pluralities of files such as the foregoing. Network resources may include content, such as words, phrases, pictures, and so on, and/or embedded information such as metadata, hyperlinks and/or embedded instructions (such as JavaScript scripts).

In the context of the present specification, "client device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
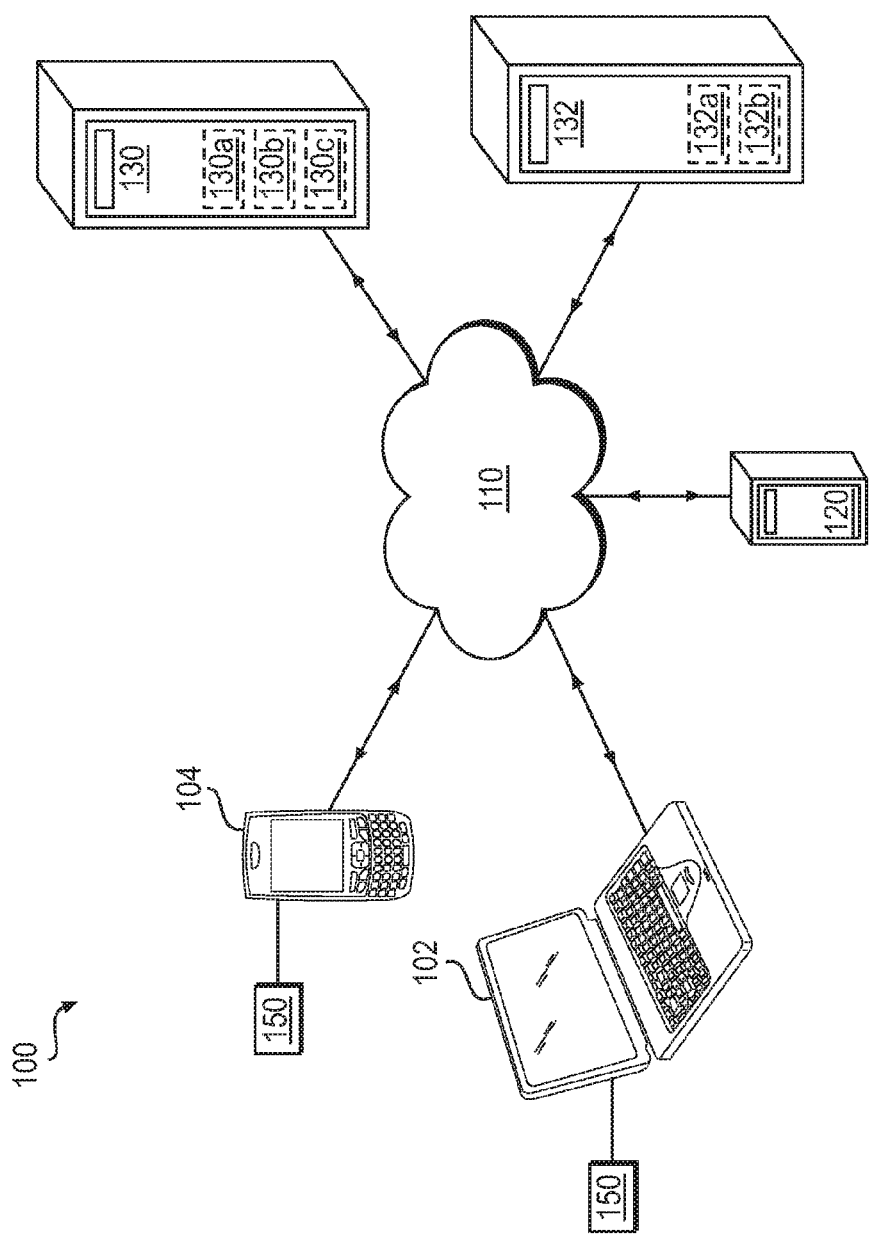
FIG. 1 is a schematic illustration of a network environment in accordance with non-limiting embodiments of the present technology.

With reference to FIG. 1, there is shown a schematic diagram of a network environment 100 suitable for implementing non-limiting embodiments of the present technology. It is to be expressly understood that the network environment 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes a first electronic device 102, a second electronic device 104 and a communication network 110. The first electronic device 102 is coupled to the communications network 110 via a communication link 103. The second electronic device 104 is coupled to the communications network 110 via a communication link 105.

Each electronic device 102, 104 is typically associated with a user (not depicted) and, as such, can sometimes be referred to as a "client device". In the illustrated embodiment, the first electronic device 102 is a laptop computer, and the second electronic device is a smartphone 104. The implementation of the electronic device 102 is however not limited to a laptop computer 102 and smartphone 104. As an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 102, 104 is known in the art and, as such, will not be described here at much length.

Although the present description is made with reference to the network environment 100 having two electronic devices 102, 104, it should be understood that the network environment 100 could include more than two electronic devices 102, 104. The number of electronic devices is not limited to the two depicted herein.

Each electronic device 102, 104 includes a user input interface (such as a keyboard, a mouse, a touch pad, a touch screen, microphone, and the like) for receiving user inputs. The electronic device 102, 104 includes a user output interface (such as a screen, a speaker, a printer and the like) for providing visual, auditory or tactile outputs to the user. Each electronic device 102, 104 includes a network communication interface (such as a modem, a network card and the like) for two-way communication over the communications network 110 via the respective communication links 103, 105. The electronic device 102, 104 also includes a processor coupled to the user input interface, the user output interface and the network communication interface. The processor is configured to execute various methods, including those described herein below. To that end the processor may store or have access to computer readable commands which, when executed, cause the processor to execute the various methods described herein. Each electronic device 102, 104 comprises hardware and/or software and/or firmware, as is known in the art, to execute various applications. Some of the applications are configured to receive and transmit information via the communication network 110. Examples of such applications include a browser application, a music streaming application, a photo sharing application, and the like.

In the illustrated embodiment of the present technology, the communications network 110 is implemented as the Internet. In other embodiments of the present technology, the communications network 110 can be implemented differently, such as a wide-area communications network, a local-area communications network, a private communications network and the like.

The communication links 103, 105 can also have various non-limiting implementations, and the particular implementation(s) of the communication link 103, 105 for each electronic device 102, 104 will depend on how the electronic device 102 is implemented. Recalling that the first electronic device 102 is implemented, in this example, as a laptop, the communication link 103 for the first electronic device 102 can be either wireless (such as the Wireless Fidelity, or WiFi® for short, Bluetooth® or the like) or wired (such as a Universal Serial Bus or USB-based connection). For the second electronic device 104, which in this exemplary embodiment, is a smartphone, the communication link 105 can also be wireless (WiFi®, Bluetooth® or the like) or wired (USB or Ethernet based connection, for example). Furthermore, each communication link 103, 105 coupling the respective electronic device 102, 104 to the communication network 110 could include more than one type of link. For example, the laptop 102 could be coupled to the network 110 via wireless as a well as a wired connection.

It should be expressly understood that implementations for the electronic device 102, 104, the communication links 103, 105 and the communications network 110 are provided for illustration purposes only. As such, those skilled in the art will easily appreciate other specific implementational details for the electronic device 102, 104, the communication link 103, 105 and the communications network 110. As such, by no means, examples provided herein above are meant to limit the scope of the present technology.

Also coupled to the communications network 110 is a network configuration server 120. The network configuration server 120 is connected to a subset of the electronic devices connected to the communication network 110. For example, in the illustrated embodiment of the network environment 100, the network configuration server 120 is coupled to the electronic devices 102, 104. The network configuration server 120 could also be connected to other servers, such as but not limited to network resource servers, application servers, and other network configuration servers, via the communication network 110. The network configuration server 120 obtains and stores network connectivity statistics, including information related to parameters such as network connection speed, network usage, bandwidth and the like, for the electronic devices connected thereto. The first and second electronic devices 102, 104 are each connected to the network configuration server 120 for providing network performance related information thereto, and to obtain, from the network configuration server 120, information related to other electronic devices (not shown) connected thereto.

The network configuration server 120 can be implemented as a conventional computer server. In an example of an embodiment of the present technology, the network configuration server 120 can be implemented as a Dell™ PowerEdge™ Server running the Microsoft™ Windows Server™ operating system. The server could also be implemented as other kinds of network equipment such as, but not limited to, a router, a switch, or a gateway, a base station and the like. The network configuration server 120 can be implemented in any suitable hardware and/or software and/ or firmware, or a combination thereof. In the depicted non-limiting embodiment of present technology, the network configuration server 120 is a single server. In alternative non-limiting embodiments of the present technology, the functionality of the network configuration server 120 may be distributed and may be implemented via multiple servers. The implementation of the network configuration server 120 is well known. However, briefly speaking, the server 120 comprises a communication interface (not shown) structured and configured to communicate with the electronic devices 102, 104 and other devices coupled to the communications network 110. The server 120 further comprises at least one computer processor (not shown) operationally connected with the communication interface and structured and configured to execute various processes to be described herein.

The network environment 100 also includes a first network resource server 130 and a second network resource server 132. The first network resource server 130 hosts three resources 130a, 130b, 130c that can be accessed by connecting to the first network resource server 130 via the communication network 110. The second network resource server 132 hosts two network resources 132a, 132b, that can be accessed by connecting to the second network resource server 132 via the communication network 110. The first and second network resource servers 130, 132 may also be connected to each other via the communication network 110, or even directly Akin to the network configuration server 120, each of the network resource servers 130, 132 can be implemented as a conventional computer server. In an example of an embodiment of the present technology, each of the network resource servers 130, 132 can be implemented as a Dell™ PowerEdge™ Server running the Microsoft™ Windows Server™ operating system. Each of the network resource servers 130, 132 can also be implemented in any other suitable hardware and/or software and/or firmware or a combination thereof. In the depicted non-limiting embodiment of present technology, each network resource server 130, 132 is a single server. In alternative non-limiting embodiments of the present technology, the functionality of each network resource server 130, 132 may be distributed and may be implemented via multiple servers.

It should also be understood that the network resource servers 130, 132 and the network resources hosted by the servers 130, 132 as presented herein is exemplary. The network environment 100 could include any number and kind of network resource servers and each network resource server could host any number and kind of network resources.

In the illustrated embodiment, for convenience and simplification of description of the present technology, each of the network resource servers 130, 132 is assumed to be a web-resource server and the network resources 130a, 130b, 130c, 132a, 132b hosted by the network resource servers 130, 132 are assumed to be web resources (or websites). It should however be understood, that the present technology is no way limited to web resource servers and web resources.

Browser Application

With reference to FIG. 1, a browser application 150 is provided on each of the first and the second electronic devices 102, 104 to enable a user (not shown) of that device 102, 104 to access one or more web resources, such as the web resources 130a, 132a, via the communication network 110. The browser application 150 on each electronic device 102, 104 is configured for operation in turbo mode and normal mode. Each electronic device 102, 104 is thus defined to be in turbo operation mode if its browser application 150 is operating in turbo mode, and in normal operation mode if its browser application 150 is operating in normal mode. In normal mode, the browser application 150 is configured to download information in the quality and resolution provided by the relevant web resource server 130, 132. In turbo mode, the browser application 150 is configured to download a smaller amount of information than in the normal mode.

In some embodiments, in turbo operation mode, the information downloaded from the web resource server 130, 132 to the electronic device 102 is compressed so as to have a lower resolution or quality than in the normal operation mode. For example, a web-page may be downloaded to the electronic device 102 such that the images appear on the electronic device 102 in a lower resolution than they would in the normal mode of operation. In some embodiments, in turbo operation mode, the information is processed to omit certain portions of the information and selectively download other portions of the information. For example, when downloading a web-page to the electronic device 102, the images could be omitted while the text is downloaded in entirety. In some other embodiments, in turbo mode of operation, a combination of compression and selective downloading could be used to reduce the amount of information being downloaded to the electronic device 102. The above description of turbo operation mode is provided as an example, and the present technology is not to be limited to any specific methods or strategies for operating a browser application 150 in turbo operation mode.

Figure 2:
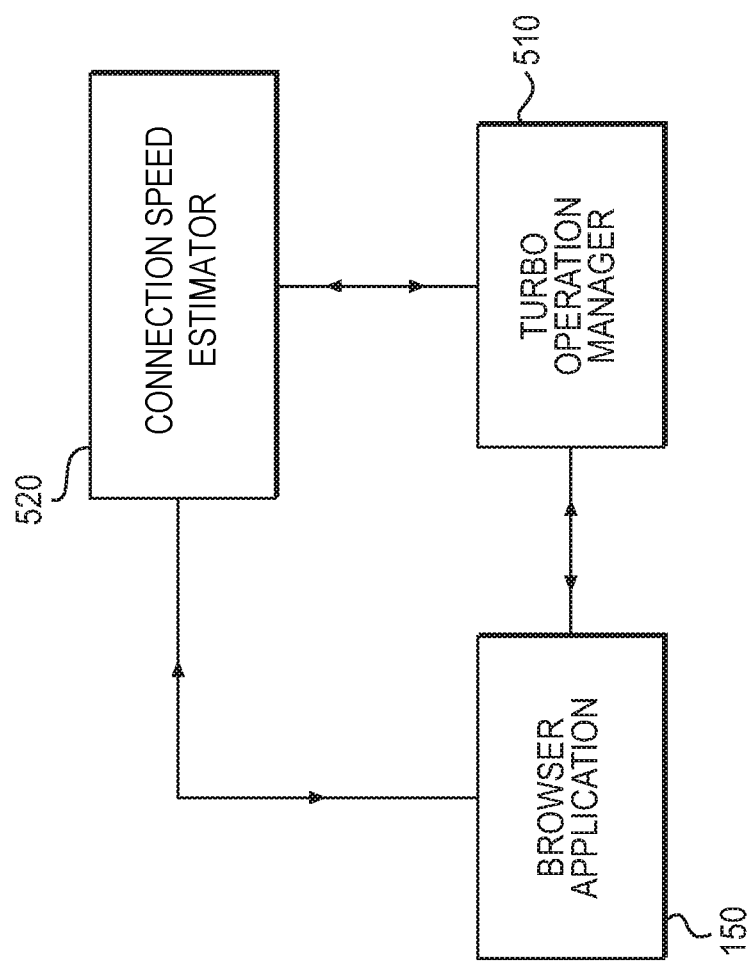
FIG. 2 is a schematic block diagram showing a system in accordance with non-limiting embodiments of the present technology for managing turbo operation of a browser application of a first electronic device in the network environment shown in FIG. 1.

With reference to FIG. 2, the browser application 150 is operatively connected to a turbo manager 510 for managing turbo mode operation of the browser application 150. In the illustrated non-limiting embodiment, the turbo operation manager 510 is integrated with the browser application 150. Thus in the illustrated embodiment, the turbo operation manager 510 is integrated with the electronic device 102. In some other alternative embodiments, the turbo operation manager 510 is integrated with the network configuration server 120. In some other embodiments, a portion of the turbo operation manager 510 can be partly integrated with the electronic device 102, and another portion of the turbo operation manager 510 is integrated with the network configuration server 120. The turbo operation manager 510 includes a combination of hardware and/or software and/or firmware for managing turbo mode operation of the browser application 150. The turbo operation manager 510 is also operatively coupled to the network configuration server 120 for receiving network statistics and to one or more user input and output interfaces (not shown) for receiving user inputs.

With reference to FIG. 2, a connection speed estimator 520 is also operatively connected to the browser application 150 for estimating connection speed for the browser application 150 of the electronic device 102. The connection speed estimator 520 measures the connection speed for the first electronic device 102, and estimates whether the connection speed is slow or fast. The connection speed estimator 520 additionally estimates the confidence level for estimations of the connection being representative of the connection speed being slow or fast. The turbo operation manager 510 is connected to the connection speed estimator 520 for receiving the estimated connection speed information. The turbo operation manager 510 may additionally be configured to control operation of the connection speed estimator 520. The connection speed estimator 520 is connected to the network configuration server 120 for providing network connection statistics thereto. In the illustrated embodiment, the connection speed estimator 520 is integrated with the electronic device 102. In some embodiments, the connection speed estimator 520 is integrated with the turbo manager 510. In some embodiments, the connection speed estimator 520 is integrated with the browser application 150 of the electronic device 102. In some other embodiments, the connection speed estimator 520 is integrated with the network configuration server 120.

Although, the description herein will be provided with reference to the browser application 150, it should however be understood that the methods and systems of the present technology are not limited to a browser application 150, but could be applied to any application which accesses information from a network resource via the communication network 110.

It should be understood that in the description provided herein for managing turbo mode operation of a first electronic device 102 based on a second electronic device 104, the second electronic device 104 is meant to refer to an electronic device, other than the first electronic device 102, which has been clustered with the first electronic device 102. The second electronic device 104 could also be a plurality of electronic devices, other than the first electronic device 102, each having been clustered with the first electronic device 102.

Cluster

In this context, the first and second electronic devices 102, 104 can be defined as being "clustered" based on a parameters, examples of which are described below.

In some embodiments, the first and second electronic devices 102, 104 are clustered based on being located in a sub-network of the communication network 110. For example, the first and second electronic devices 102, 104 could each be a mobile electronic device connected to the communication network 110 via a common base station. As another example, the first and second electronic devices 102, 104 could be connected to a common network node, such as a router or server in a local area network.

Figure 3:
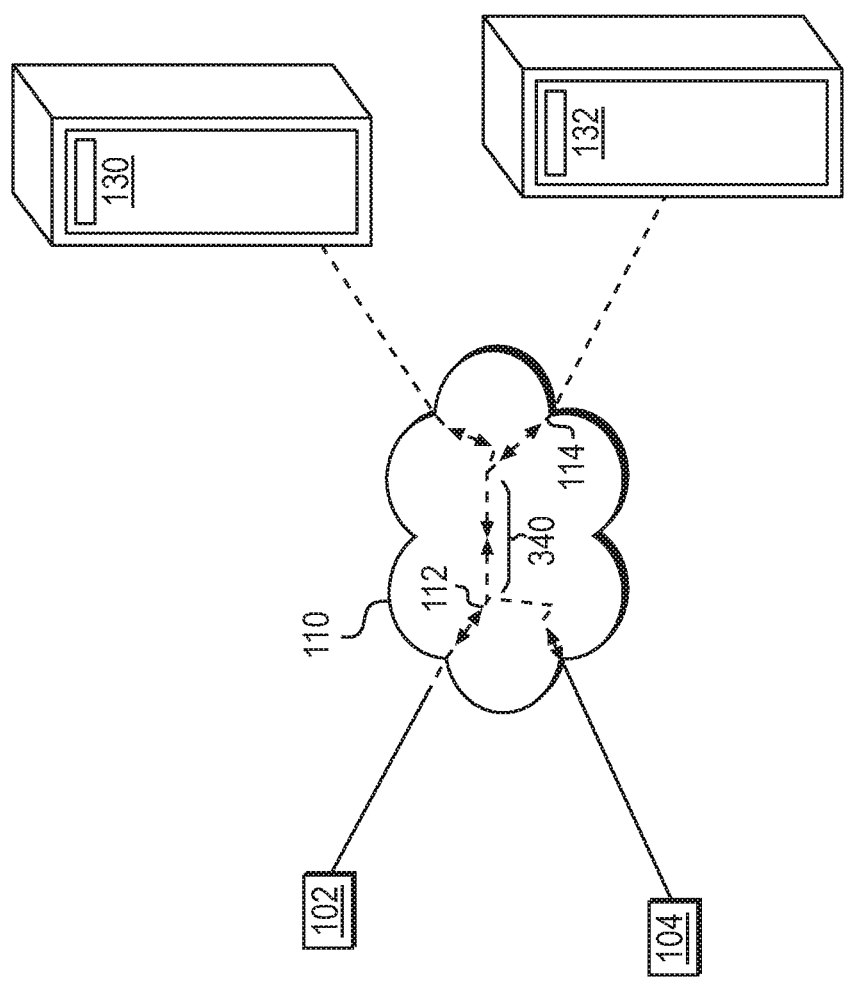
FIG. 3 is a schematic illustration showing clustering in accordance with non-limiting embodiments of the present technology of a first and second electronic device of the network environment of FIG. 1.

In some embodiments, the first and second electronic devices 102, 104 clustered based on an overlap in their communication paths in the communications network 110. For example, with reference to FIG. 3, the first electronic device 102 is connected to a first network resource 130a via a first path 112, and the second electronic device 104 is connected to a second network resource 132a via a second path 114. If there is an overlap 340 between at least a portion of the communication paths 112, 114 used by the first and second electronic devices 102, 104, the first and second electronic devices 102, 104 could be defined as being clustered.

In some embodiments, the first and second electronic devices 102, 104 are clustered based on the type of communication link 103, 105. For example, if both communication links 103, 105 are of a wireless type, or if both communication links 103, 105 use the same communication protocol, such as 2G, or 3G or LTE. In some embodiments, the first and second electronic devices 102, 104 are defined to be clustered based on the bandwidth and/or connection speed of their respective communication links 103, 105.

In some embodiments, the first and second electronic devices 102, 104 are clustered based on their connection to a common network resource server 130, or 132. In general, the first and second electronic devices 102, 104 can each be connected to any of the available network resources 130, 132 via the communication network 110. When the first electronic device 102 and the second electronic device 104 are each connected to the same one of the network resources 130, 132, they could be defined as being clustered. For example, the first and second electronic devices 102, 104 could be clustered when connected to the same web resource 130a. As another example, the first and second electronic devices 102 could be clustered when the first electronic device is connected to a first web resource 130a and the second electronic device is connected to a second web resource 130b, and both of the web resources 103a, 130b are hosted by the same network resource server 130.

In some embodiments, the first and second electronic devices 102, 104 are clustered based on their respective geographic or physical locations. For example, the first and second electronic devices 102, 104 could be clustered if they are each located within a predetermined geographical area. As another example, the first and second electronic devices 102, 104 could be clustered if the second electronic device 104 is located within a predetermined distance from the first electronic device 102.

It should be understood that the identity of the second electronic device 104 being clustered with the first electronic device 102 could vary with time. For example, if the first electronic device 102 is a cellular phone, the second electronic device (s) 104 that are connected to the same base station as the first electronic device 102 will vary with time as the first electronic device 102 moves from one region to another.

Method

Figure 4:
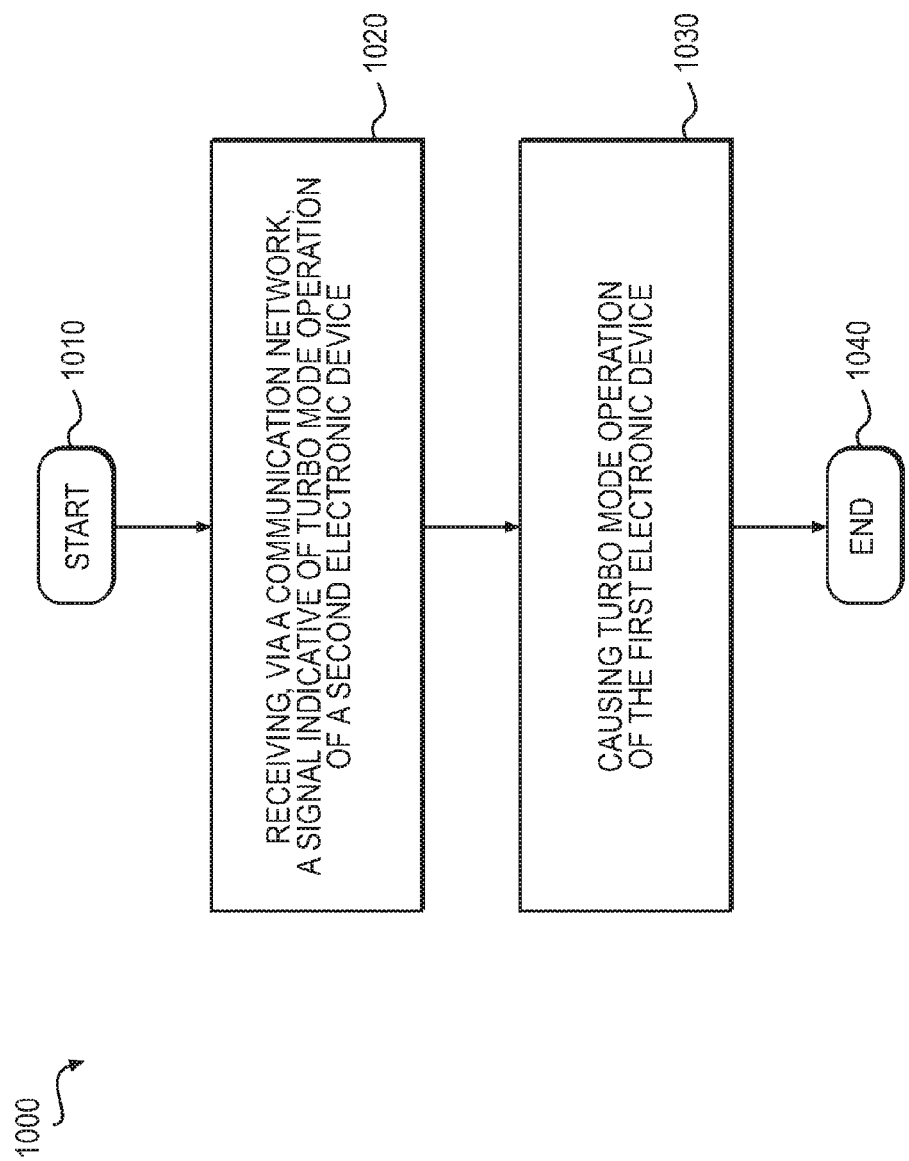
FIG. 4 is a flow chart of a method for managing turbo mode operation according to an embodiment of the present technology.

A method 1000 of the present technology, for managing turbo mode operation, will now be described with reference to FIG. 4. The method 1000 will be described with respect to turbo mode operation of the first electronic device 102 for accessing content from the web servers 130, 132 using the browser application 150. As mentioned above, the method 1000 is executed at least in part by the turbo operation manager 510.

The method 1000 for managing turbo mode operation starts at step 1010 when the user of electronic device 102 launches the browser application 150. In the illustrated embodiment of the method 1000, the browser application 150 is operated in normal mode when it is first launched. The method 1000 then proceeds to step 1020.

At step 1020, the turbo operation manager 510 receives a signal via the communication network 110 indicative of turbo mode operation of the second electronic device 104. In some embodiments, the signal is a trigger signal generated at the server 120 and sent to all other connected electronic devices. In some embodiments, the turbo operation manager 510 sends a query to the server, and the signal is generated by the server 120 in response to the query received from the turbo manager 510. Once the signal indicative of turbo mode operation of the second electronic device 104 is received at step 1020, the method 1000 proceeds to step 1030.

In some embodiments, the signal is an indication of the second electronic device 104 being operated in turbo mode.

In some embodiments, the signal received at step 1020 is an indication of the need for turbo mode operation for the second electronic device 104, regardless of whether or not the second electronic device 104 is operating in turbo mode. For example, the signal received at step 1020 could be an indication of the connection speed of the second electronic device 104 being lower than a specified second electronic device connection speed threshold. The second electronic device connection speed threshold could be predetermined, for example, it could be based on a user setting for the second electronic device 104, or a user setting for the first electronic device 102. The connection speed of the second electronic device 104 may be estimated using any known algorithms, methods, techniques, and the like. The present technology is not limited to any particular method for estimation of connection speed of the second electronic device 104.

As mentioned earlier, the second electronic device 104 could be a plurality of electronic devices other than the first electronic device 102, each of which has been clustered with the first electronic device 102. In this case, the signal received at step 1020 could be indicative of the connection speeds of a single electronic device 104, or a subset of the plurality of electronic devices 104, or all of the plurality of electronic devices 104.

At step 1030, the first electronic device 102 is caused to execute turbo mode operation responsive to the reception, at step 1020, of the signal indicative of turbo mode operation of the second electronic device 104.

In some embodiments, causing the first electronic device 102 to execute turbo mode operation implies commencing turbo mode operation of the browser application 150 on the first electronic device 102.

In some embodiments, causing the first electronic device 102 to execute turbo mode operation implies requesting a confirmation from the user of the first electronic device 102 for commencing operation in turbo mode, and then commencing turbo mode operation of the browser application 150 on the first electronic device 102 if and when the confirmation is received. The confirmation could be requested by visually displaying an icon and/or message to the user of the first electronic device 102. The request for confirmation could be output to the user, by other means and to other output interfaces of the first electronic device 102, for example, it could be output as an audio message on the speakers of the laptop computer 102. The user may be given a choice to either confirm or deny the request to commence turbo mode operation of the first electronic device 102. The confirmation of the request (or denial thereof) for execution of turbo mode operation could be received via any one of the user interfaces provided on the electronic device 102. For example, the user of the first electronic device 102 could indicate their selection (confirmation or denial) by pressing a button on the touch screen or speaking into the microphone of the first electronic device 102. In some embodiments, the user may instead be presented with an option to take a specific action in order to prevent operation in turbo mode, for example, the user may be asked to press a button on the smartphone, if the user wishes to prevent commencement of operation in turbo mode.

First Electronic Device Connection Speed

In some embodiments, turbo mode operation of the first electronic device 102 is caused responsive to receiving a signal indicative of the turbo mode operation of the second electronic device 104 and to the connection speed of the first electronic device 102 being slow. In the illustrated embodiment, the connection speed of the first electronic device 102 is estimated to be slow if it is below a first electronic device connection speed threshold.

In some embodiments, the connection speed for the first electronic device 102 is obtained responsive to receiving a signal indicative of the turbo mode operation of the second electronic device 104.

In some embodiments, when the browser application 150 is launched at step 1010, the connection speed estimator 520 connected to the browser application 150 may begin estimation of the connection speed of the first electronic device 102 for uploading and downloading information from the web resource server 130, 132 via the communication network 110. The connection speed estimator 520 may continue estimating the connection speed while the method 1000 proceeds to step 1020. The estimated connection speed information is sent to the network configuration server 120 for managing turbo mode operation of other connected electronic devices. The estimated connection speed information may be stored by the network configuration server 120, for use at future times for managing turbo mode operation of the first electronic device 102. The estimated connection speed information could also stored in a local cache memory (not shown) of the first electronic device 102, for use at future times for managing turbo mode operation of the first electronic device 102.

In some embodiments, previously stored estimations of connection speed for the first electronic device 102 are also taken into consideration for causing the execution of turbo mode operation. Thus, in some embodiments, the execution of turbo mode operation for the first electronic device 102 is caused responsive to receiving a signal indicative of turbo mode operation of the second electronic device 104 and to one or more previously stored estimations of connection speed for the first electronic device 102 being estimated to be slow. In the illustrated embodiment, a first electronic device previously stored connection speed threshold is defined and a previously stored connection speed is estimated to be slow if the previously stored connection speed is determined to be less than first electronic device previously stored connection speed threshold. The first electronic device previously stored connection speed threshold could be greater than, less than, or the same as the first electronic device connection speed threshold.

In some embodiments, the previously stored connection speed for the first electronic device 102 is obtained responsive to receiving a signal indicative of the turbo mode operation of the second electronic device 104.

Confidence Levels

The present description is not limited to any particular method for estimating connection speed. The connection speeds for the first and second electronic device 102, 104 may be determined using any suitable algorithms and methods. Whether or not the connection speed is slow may also be estimated using any suitable algorithms, methods, and techniques. As will be understood by a skilled worker, as the sampling time and/or sampling frequency increases, the precision, and thus the confidence level for estimation of connection speed, and whether the connection speed is slow or fast, increases. It should be understood that the precision and confidence level for the estimation of the connection speed may depend on other factors as well, such as the specific method used for estimation of the connection speeds mentioned above. In some embodiments of the present technology, the confidence levels for the estimations of the connection speeds mentioned above are also taken into consideration for the causing of execution of turbo mode operation of the first electronic device 102.

In some embodiments, the signal (received at step 1020) indicative of turbo mode operation of the second electronic device 104 is further indicative of a confidence level for estimation of the connection speed of the second electronic device 104 being slow. For example, the signal could be indicative of the confidence level for estimation of the connection speed of the second electronic device 104 being slow being greater than a second electronic device connection speed confidence level threshold. In some other embodiments, in addition to the signal indicative of turbo mode operation of the second electronic device 104, the server 120 could send information to the turbo operation manager 510 including a confidence level for the estimation of connection speed for the second electronic device 104.

In some embodiments, the connection speed information for the first electronic device 102 sent to the network configuration server 120 and/or stored in the local cache of the electronic device 102 includes the estimation of the connection speed for the first electronic device 102 as well as the confidence level for the estimation thereof. For example, the connection speed information could include an estimation of whether or not the connection speed for the first electronic device 102 is slow, and a confidence level for determining that the connection speed for the first electronic device 102 is slow. In some embodiments, in addition to the reception of a signal indicative of the turbo mode operation of the second electronic device 104, the execution of turbo mode operation is caused responsive to the connection speed of the first electronic device 102 being below a first electronic device connection speed threshold and the confidence level for the estimation of the connection speed of the first electronic device being greater than a first electronic device connection speed confidence threshold.

In some embodiments, the confidence levels for the previously stored estimations of connection speed for the first electronic device 102 are also taken into consideration for causing the execution of turbo mode operation. Thus, in some embodiments, a first electronic device previously stored connection speed confidence threshold may be defined and execution of turbo mode may be caused responsive to the confidence level for the previously stored estimation of connection speed for the first electronic device 102 being greater than the first electronic device previously stored connection speed confidence threshold, in addition to the previously stored connection speed for the first electronic device 102 being estimated to be slow, and to receiving the signal indicative of turbo mode operation of the second electronic device 104. The first electronic device previously stored connection speed confidence threshold could be greater than, less than, or the same as the first electronic device connection speed confidence threshold.

In some embodiments, the execution of turbo mode could be caused based on an aggregate confidence level. The aggregate confidence level may be obtained based on the respective confidence levels for estimations of first electronic device connection speed, second electronic device connection speed and first electronic device previously stored connection speed being slow. The aggregate confidence level may be a sum of the aforementioned confidence levels. The aggregate confidence level could also be a weighted sum of the aforementioned confidence levels. For example, the confidence levels could be weighted so as to give a relatively greater weight to the confidence level for first electronic device connection speed. The execution of turbo mode could be caused responsive to the aggregate confidence level being greater than a predetermined aggregate confidence level threshold. The present technology thus allows the turbo operation manager 510 to separate different sources of confidence, and to add and/or delete sources of confidence as desired.

In some embodiments, turbo mode operation of the first electronic device 102 could be caused responsive to receiving the signal indicative of turbo mode operation of the second electronic device 104 and responsive to an additional parameter other than those mentioned above. The additional parameter could include a predefined time of day, or a predefined geographical location, for example. The predefined additional parameter could be defined as part of a user or device setting, for example. Thus, in some embodiments, causing of turbo mode operation for the first electronic device 102 could be responsive to receiving the signal indicative of turbo mode operation of the second electronic device 104 and responsive to the time of day when the method 1000 is being implemented being within a predefined time interval during the day. In some embodiments, causing of turbo mode operation for the first electronic device 102 could be responsive to receiving the signal indicative of turbo mode operation of the second electronic device 104 and responsive to first electronic device 102 being located within a predefined geographical area. It should be understood that the additional parameters should not be limited to the time of day and geographical location, and that the time of day and geographical location are merely meant to be exemplary.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of managing turbo mode operation of a first electronic device, the method being executable at a computing apparatus, the method comprising:
   clustering a second electronic device with the first electronic device, the second electronic device being other than the first electronic device;
   receiving, via a communication network, a signal indicative of turbo mode operation of the second electronic device while the second electronic device is clustered with the first electronic device, the signal indicative of turbo mode operation of the second electronic device being indicative of a connection speed of the second electronic device being less than a second electronic device connection speed threshold;
   causing turbo mode operation of the first electronic device in response to:
      the second electronic device still being in the same cluster with the first electronic device; and
      receiving the signal indicative of turbo mode operation of the second electronic device,
      the first and the second electronic devices being configured to download less information in turbo mode operation than in normal mode operation.

2. The method of claim 1, wherein the causing turbo mode operation for the first electronic device comprises:
   requesting a confirmation from the first electronic device for commencing operation in turbo mode; and
   responsive to receiving the confirmation from the first electronic device for commencing operation in turbo mode, operating the first electronic device in turbo mode.

3. The method of claim 1, wherein:
   the first electronic device is in communication with a first network resource via a first communication path;
   the second electronic device is in communication with a second network resource via a second communication path; and
   clustering of the second electronic device with the first electronic device is based on an overlap between at least a portion of the first communication path and at least a portion of the second communication path.

4. The method of claim 1, wherein:
   the first electronic device is in communication with a first network resource via a first communication link;
   the second electronic device is in communication with a second network resource via a second communication link; and
   clustering of the second electronic device with the first electronic device is based on a respective type of the first and second communication link.

5. The method of claim 1, wherein:
   the first electronic device is connected to a first network resource;
   the second electronic device is connected to a second network resource; and
   clustering the second electronic device with the first electronic device is responsive to the first network resource being the same as the second network resource.

6. The method of claim 1, wherein:
   clustering the second electronic device with the first electronic device is responsive to the first electronic device and the second electronic device being disposed within a predefined geographical area.

7. The method of claim 1, wherein the signal indicative of turbo mode operation of the second electronic device is indicative of the second electronic device operating in turbo mode.

8. The method of claim 1, wherein the signal indicative of turbo mode operation of the second electronic device is further indicative of a second electronic device connection speed confidence level, the second electronic device connection speed confidence level being a confidence level for an estimation of the connection speed of the second electronic device being less than the second electronic device confidence threshold.

9. The method of claim 1, further comprising obtaining a connection speed of the first electronic device, and wherein said causing of turbo mode operation for the first electronic device is executed responsive to the connection speed of the first electronic device being below a first electronic device connection speed threshold.

10. The method of claim 9, wherein the obtaining of the connection speed of the first electronic device is executed responsive to the signal indicative of turbo mode operation of the second electronic device.

11. The method of claim 9, further comprising:
   obtaining a first electronic device connection speed confidence level, the first electronic device connection speed confidence level being a confidence level for estimation of the connection speed of the first electronic device being less than the first electronic device connection speed threshold, and wherein the causing of turbo mode operation for the first electronic device is executed responsive to the first electronic device connection speed confidence level being greater than a first electronic device connection speed confidence threshold.

12. The method of claim 1, further comprising:
obtaining a previously stored connection speed of the first electronic device; and wherein
the causing of turbo mode operation for the first electronic device is executed responsive to the previously stored connection speed of the first electronic device being below a previous connection speed threshold.

13. The method of claim 12, wherein the obtaining of the previously stored connection speed of the first electronic device is executed responsive to the signal indicative of turbo mode operation of the second electronic device.

14. The method of claim 12, further comprising:
obtaining a first electronic device previously stored connection speed confidence level, the first electronic device previously stored connection speed confidence level being a confidence level for estimation of the previously stored connection speed of the first electronic device being below the previous connection speed threshold, and wherein
the causing of turbo mode operation for the first electronic device is executed responsive to the first electronic device previously stored connection speed confidence level being greater than a previously stored connection speed confidence threshold.

15. The method of claim 1, further comprising:
obtaining a connection speed of the first electronic device and a first confidence level for estimation of the connection speed of the first electronic device being below a first electronic device connection speed threshold;
obtaining a connection speed of the second electronic device and a second confidence level for estimation of the connection speed of the second electronic device being below a second electronic device connection speed threshold;
obtaining a previously stored connection speed of the first electronic device and a third confidence level for estimation of the previously stored connection speed of the first electronic device being below a first electronic device previous connection speed threshold; and wherein,
the causing of turbo mode operation for the first electronic device is executed responsive to at least one of:
the connection speed of the first electronic device being below the first electronic device connection speed threshold;
the connection speed of the second electronic device being below the second electronic device connection speed threshold;
the previously stored connection speed of the first electronic device being below the previous connection speed threshold; and
an aggregate confidence level being greater than an aggregate confidence threshold, the aggregate confidence level being based on the first confidence level, the second confidence level, and the third confidence level.

16. The method of claim 1, wherein the computing apparatus is the first electronic device.

17. The method of claim 1, wherein the computing apparatus is a server operatively coupled to the first and second electronic device.

18. A server for managing turbo mode operation of a first electronic device, the server comprising:
a network interface for communicating, via a communication network, with the first electronic device and the second electronic device; and
a processor operatively coupled to the network interface, the processor being configured to:
cluster a second electronic device with the first electronic device, the second electronic device being other than the first electronic device;
receive a signal indicative of turbo mode operation of the second electronic device while the second electronic device is clustered with the first electronic device, the signal indicative of turbo mode operation of the second electronic device being indicative of a connection speed of the second electronic device being less than a second electronic device connection speed threshold; and
provide a signal to the first user device for causing turbo mode operation of the first electronic device in response to receiving the signal indicative of turbo mode operation of the second electronic device and if the first electronic device is still in the same cluster as the second electronic device, the first and the second electronic devices being configured to download less information in turbo mode operation than in normal mode operation.

19. The server of claim 18, wherein:
the first electronic device is in communication with a first network resource via a first communication path;
the second electronic device is in communication with a second network resource via a second communication path; and
the processor is configured to:
cluster the second electronic device with the first electronic device based on an overlap between at least a portion of the first communication path and at least a portion of the second communication path.

20. An electronic device configured for turbo mode operation, the electronic device comprising:
a communication interface for communicating with a server via a communication network; and
a processor for managing turbo mode operation being operatively coupled to the communication interface, the processor being configured to:
cluster a second electronic device with the first electronic device, the second electronic device being other than the first electronic device;
receive from the server, via the communication interface, a signal indicative of turbo mode operation of the second electronic device while the second electronic device is clustered with the first electronic device, the signal indicative of turbo mode operation of the second electronic device being indicative of a connection speed of the second electronic device being less than a second electronic device connection speed threshold; and
if the first and the second electronic devices are still in the same cluster and responsive to the receipt of the signal indicative of turbo mode operation of the second electronic device, cause turbo mode operation of the first electronic device, the first and the second electronic device downloading less information in the turbo mode operation than in a normal mode.

\* \* \* \* \*